(12) United States Patent
Wang et al.

(10) Patent No.: US 9,216,663 B2
(45) Date of Patent: Dec. 22, 2015

(54) ROAD SURFACE SELF-ADAPTING ANTI-SLIP ANTI-LOCK CONTROL METHOD FOR ELECTRICALLY DRIVEN MINE VEHICLE

(71) Applicants: Shanghai Huaxing Digital Technology Co., LTD, Shanghai (CN); Shanghai Sany Heavy Machinery Limited, Shanghai (CN)

(72) Inventors: Jianming Wang, Shanghai (CN); Lie Qi, Shanghai (CN); Yuntang Teng, Shanghai (CN)

(73) Assignees: SHANGHAI HUAXING DIGITAL TECHNOLOGY, Shanghai (CN); SHANGHAI SANY HEAVY MACHINERY LIMITED, Shanghai (CN)

( * ) Notice: Subject to any disclaimer, the term of this patent is extended or adjusted under 35 U.S.C. 154(b) by 0 days.

(21) Appl. No.: 14/348,741

(22) PCT Filed: Dec. 5, 2012

(86) PCT No.: PCT/CN2012/085908
§ 371 (c)(1),
(2) Date: Mar. 31, 2014

(87) PCT Pub. No.: WO2013/185448
PCT Pub. Date: Dec. 19, 2013

(65) Prior Publication Data
US 2014/0257616 A1 Sep. 11, 2014

(30) Foreign Application Priority Data

Jun. 11, 2012 (CN) .......................... 2012 1 0190118

(51) Int. Cl.
*B60L 15/00* (2006.01)
*B60L 15/20* (2006.01)
(Continued)

(52) U.S. Cl.
CPC ................ *B60L 15/20* (2013.01); *B60T 8/176* (2013.01); *B60T 8/17616* (2013.01); *Y02T 10/7258* (2013.01)

(58) Field of Classification Search
None
See application file for complete search history.

(56) References Cited

U.S. PATENT DOCUMENTS 5,432,413 A * 7/1995 Duke et al. ..................... 318/139
5,474,368 A 12/1995 Sano
(Continued)

FOREIGN PATENT DOCUMENTS

CN 101088818 12/2007
CN 101200183 6/2008
(Continued)

*Primary Examiner* — Jonathan M Dager
(74) *Attorney, Agent, or Firm* — Robert L. Wolter; Beusse, Wolter, Sanks & Maire, PLLC

(57) ABSTRACT

A road surface self-adapting anti-slip anti-lock control method for an electrically driven mine vehicle comprises the following steps: if the vehicle is in drive mode, judging whether the speed of a designated driving wheel and the slip ratio of said wheel are greater than the corresponding preset value; exiting, if any of the two judging results is negative; if the speed of the vehicle is more than a first preset value, adjusting the torque of the designated driving wheel according to a high speed anti-slip policy, if not, according to a low speed anti-slip policy; judging whether the speed of the vehicle and the slip ratio of the designated drive wheel are more than the corresponding preset value in brake mode, thereby determining whether the anti-lock strategy is carried out. The control method is simple, is low in cost, and is convenient to debug on the mine vehicle.

7 Claims, 4 Drawing Sheets

(51) Int. Cl.
*B60T 8/176* (2006.01)
*B60T 8/1761* (2006.01)

(56) References Cited

U.S. PATENT DOCUMENTS 5,551,769 A    9/1996  Luckevich
8,380,416 B2*  2/2013  Offerle et al. .................. 701/83
2009/0203496 A1*  8/2009  Staub et al. ..................... 477/3
2012/0116618 A1*  5/2012  Tate et al. ...................... 701/22
2012/0116619 A1*  5/2012  Tate et al. ...................... 701/22

FOREIGN PATENT DOCUMENTS

EP    2460703    6/2012
JP    9-328063   12/1997

* cited by examiner

ROAD SURFACE SELF-ADAPTING ANTI-SLIP ANTI-LOCK CONTROL METHOD FOR ELECTRICALLY DRIVEN MINE VEHICLE

CROSS-REFERENCE TO RELATED APPLICATIONS

This application claims priority to Chinese Application No. 201210190118.6 filed Jun. 11, 2012, and incorporated herein by reference in its entirety.

TECHNICAL FIELD

The present invention relates to a method for vehicle self-adapting anti-slip anti-lock control, more specifically, to a road surface self-adapting anti-slip anti-lock control method for an electrically driven mine vehicle.

BACKGROUND OF THE INVENTION

So far, there are two kinds of control method for anti-slip anti-lock system, one is logic threshold control algorithm, the other one is intelligent control algorithm which mainly comprises the proportional-integral-differential controller (PID) method based on the genetic algorithm, the fuzzy control method, the sliding mode variable structure control method, the most optimal control method and so on. The logic threshold control method is simple and easy to be realized. However, it is difficult to define the threshold value. And the fluctuant wheel speed will bring a had feeling to drivers. Similarly, the wheels can't be maintained in the best slip ratio. Though the other intelligent control methods owns better control effect, nevertheless, the control method is complicated, and accurate mathematic model and vehicle speed sensor are required, which leads to higher cost.

SUMMARY OF THE INVENTION

Due to the above technical problems of anti-slip anti-lock control system, the present invention provides a method for a road surface self-adapting anti-slip anti-lock control for an electrically driven mine vehicle.

The following technical means will be taken to solve the technical problems:

A road surface self-adapting anti-slip anti-lock control method for an electrically driven mine vehicle comprises the following steps:

S1: judging whether the vehicle is in drive mode, and if the result is negative, skipping to S10; and if the judging result is positive, skipping to S2;

S2: judging whether a speed of a designated driving wheel of the vehicle is greater than a preset wheel-speed value, and judging whether the slip ratio of the wheel is greater than a preset slip-ratio value; if either of the two judging results is negative, exiting; and if the two judging results are positive, skipping to S3;

S3: judging whether the speed of the vehicle is more than a first preset value, and if a judging result is negative, skipping to Step 7 and if the judging result is positive, skipping to S4;

S4: adjusting a torque of the designated driving wheel according to a high speed anti-slip policy; then, skipping to S5

S5: judging whether the speed of the designated drive wheel is less than the corresponding preset value, if a judging result is positive, exiting; skipping to S6, if the judging result is negative;

S6: judging whether the torque partition coefficient of the designated driving wheel is greater than the preset one; if a judging result is negative, returning to S4; if the result is positive, exiting;

S7: adjusting the torque of the designated drive wheel according to a low speed anti-slip policy; then, skipping to S8;

S8: judging whether the speed of a designated driving wheel of the vehicle is less than a preset wheel-speed value, if a judging result is positive, exiting; and if the judging result is negative, skipping to S9;

S9: judging whether the torque partition coefficient of the designated driving wheel of the vehicle is greater than a preset one, if a judging result is negative, skipping to S7, if the judging result is positive, exiting;

S10: judging whether the vehicle is in brake mode, if a judging result is negative, exiting; if the judging result is positive, skipping to S11;

S11: judging whether the speed of the vehicle is more than a second preset value and judging whether the slip ratio of the wheel is greater than a preset slip-ratio value; if either of the two judging results is negative, exiting; if the judging result is positive, skipping to S12;

S12: adjusting braking force of the designated driving wheel according to the preset anti-lock strategy; then, skipping to S13;

S13: judging whether the speed of the vehicle is less than the second preset speeding value, if the result is positive, exiting; if the judging result is negative, skipping to S14;

S14: judging whether the slip ratio of the wheel is less than a preset minimum slip-ratio value; if a judging result is negative, returning to S12; if a judging result is positive, exiting.

Preferably, the preset wheel speed is 2 km/h.

Preferably, the preset slip ratio is 15%.

Preferably, the preset torque partition coefficient is 0.48.

Preferably, the first preset vehicle speed value is 10 km/h; the second preset speed value is 2 km/h.

Preferably, the minimum preset slip ratio is 6%.

Preferably, the preset high speed anti-slip strategy comprises the following steps:

When the acceleration of the designated driving wheel is increased to its preset threshold value, or the slip ratio is increased to its preset upper limit threshold value, the declining rate of the designated driving wheel torque is achieved through the preset speed down function calculation in accordance with the present slip ratio of the designated driving wheel, and the torques of the designated driving wheel and the coaxial wheel are reduced in accordance with the declining rate of the designated driving wheel.

When the deceleration of the designated driving wheel is increased to its preset threshold value, or the slip ratio is reduced to its preset lower preset threshold value, the increasing rate of the designated driving wheel torque is achieved through the preset speed up function calculation in accordance with the present slip ratio of the designated driving wheel, and the torques of the designated driving wheel and the coaxial wheel are increased in accordance with the increasing rate of the designated driving wheel.

The speed down function is preset by the interpolation method, which takes the slip ratio of the designated driving wheel as independent variables and takes the declining rate of the designated driving wheel torque as the speed down function of function value. And an adjustable parameter is reversed in the speed down function.

The speed up function is preset by the interpolation method, which takes the slip ratio of the designated driving wheel as independent variables and takes the increasing rate of the designated driving wheel torque as the speed up function of function value. And an adjustable parameter is reversed in the speed up function.

Preferably, the preset low speed anti-slip policy comprises the following steps:

When the acceleration of the designated driving wheel is increased to its preset threshold value, or the slip ratio is increased to its preset upper limit threshold value, the declining rate of the designated driving wheel torque is achieved through the preset speed down function calculation in accordance with the present slip ratio of the designated driving wheel, and the designated driving wheel torque is reduced in accordance with the declining rate of the designated driving wheel, the coaxial wheel torque of the designated driving wheel is increased simultaneously.

When the deceleration of the designated driving wheel is increased to its preset threshold value, or the slip ratio is reduced to its preset lower limit threshold value, the increasing rate of the designated driving wheel torque is achieved through the preset speed up function calculation in accordance with the present slip ratio of the designated driving wheel, and the designated driving wheel torque is increased in accordance with the declining rate of the designated driving wheel, the coaxial wheel torque of the designated driving wheel is reduced simultaneously.

The speed down function is preset by the interpolation method, which takes the slip ratio of the designated driving wheel as independent variables and takes the declining rate of the designated driving wheel torque as the speed down function of function value. And an adjustable parameter is reversed in the speed down function.

The speed up function is preset by the interpolation method, which takes the slip ratio of the designated driving wheel as independent variables and takes the increasing rate of the designated driving wheel torque as the speed up function of function value. And an adjustable parameter is reversed in the speed up function.

Preferably, the anti-lock strategy comprises the following steps:

When the acceleration of the designated driving wheel is increased to its preset threshold value, or the slip ratio is increased to its preset upper limit threshold value, the declining rate of the designated driving wheel torque is achieved through the preset speed down function calculation in accordance with the present slip ratio of the designated driving wheel, and the designated driving wheel torque is reduced in accordance with the declining rate of the designated driving wheel torque through the braking control system.

The speed down function is preset by the interpolation method, which takes the slip ratio of the designated driving wheel as independent variables and takes the declining rate of the designated driving wheel torque as the speed down function of the function value. And an adjustable parameter is reversed in the speed down function.

Preferably, when the torque of the designated driving wheel is increased continuously, the increased speed of the designated driving wheel torque is reduced by adjusting the adjustable parameter of the speed down function.

Preferably, a group of representative slip ratio values of the designated driving wheel is utilized in advance, so as to calculate the declining rate of the designated driving wheel torque according to the speed down function. A group of representative slip ratio value of the designated driving wheel is utilized in advance, so as to calculate the increasing rate of the designated driving wheel torque according to the speed up function. Filling the declining rate of the designated driving wheel torque and the increasing rate of the designated driving wheel torque into the form, and the outcome is acquired in the form of table look-up.

The effects of the present invention technical are as follows: the control method is simple and easy to be realized; and it owns strong self-adaptive capability and a low requirement on a sensor, low in cost. And it is convenient to debug on the mine vehicle.

DESCRIPTION OF THE PREFERRED EMBODIMENT

The present invention will be further illustrated in combination with the following Figures and embodiments, but it should not be deemed as limitation of the present invention.

Figure 1:
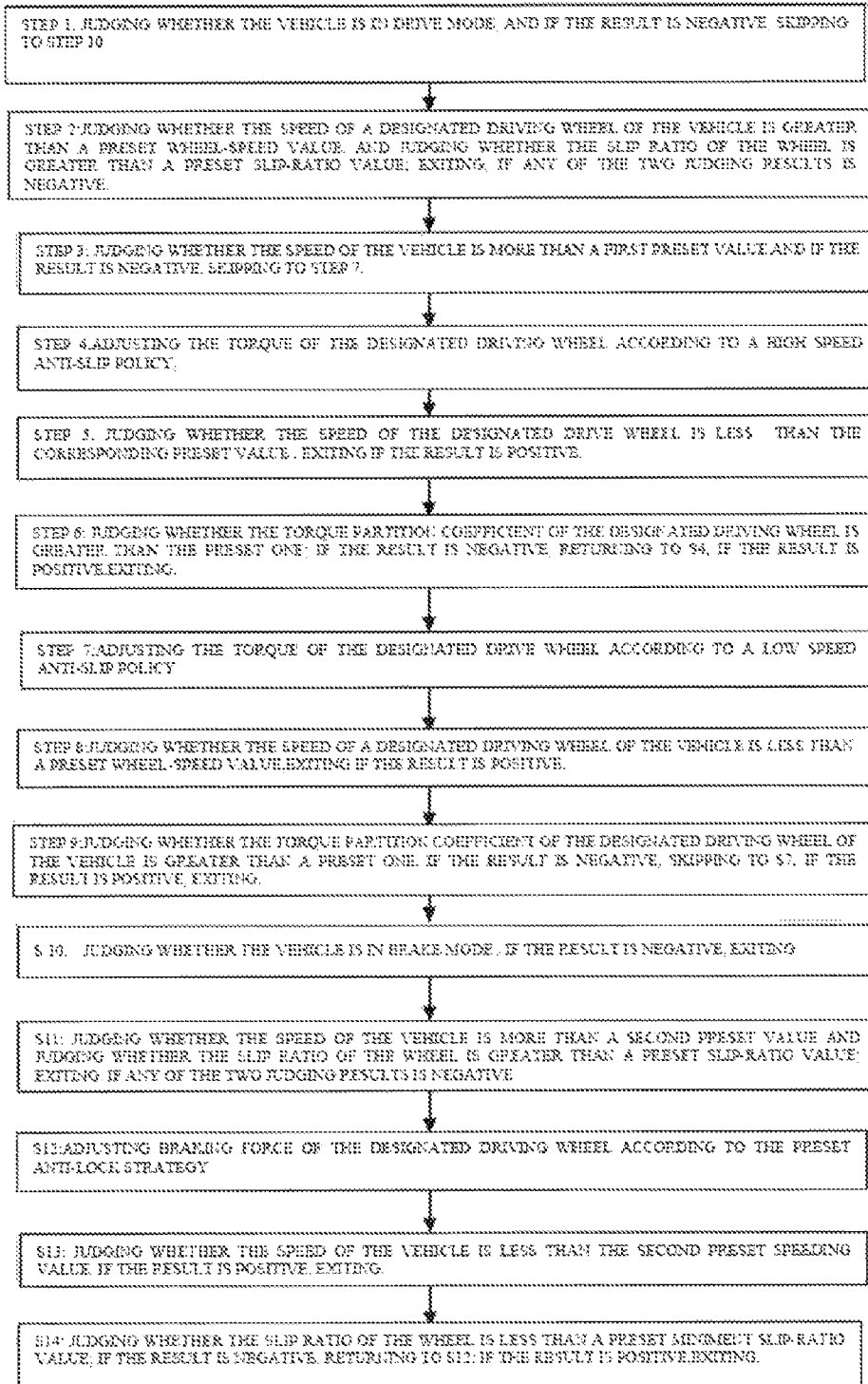
FIG. 1 is a flow chart of a road surface self-adapting anti-slip anti-lock control method for an electrically driven mine vehicle

As shown in FIG. 1, a road surface self-adapting anti-slip anti-lock control method for an electrically driven mine vehicle comprises the following steps:

S1: judging whether the vehicle is in drive mode, and if the result is negative, skipping to S10;

S2: judging whether the speed of a designated driving wheel of the vehicle is greater than a preset wheel-speed value, and judging whether the slip ratio of the wheel is greater than a preset slip-ratio value; if either of the two judging results is negative, exiting;

S3: judging whether the speed of the vehicle is more than a first preset value, and if the result is negative, skipping to Step 7;

S4: adjusting the torque of the designated driving wheel according to a high speed anti-slip policy;

S5: judging whether the speed of the designated drive wheel is less than the corresponding preset value, if the result is positive, exiting;

S6: judging whether the torque partition coefficient of the designated driving wheel is greater than the preset one; if the result is negative, returning to S4; if the result is positive, exiting;

S7: adjusting the torque of the designated drive wheel according to a low speed anti-slip policy;

S8: judging whether the speed of a designated driving wheel of the vehicle is less than a preset wheel-speed value, if the result is positive, exiting;

S9: judging whether the torque partition coefficient of the designated driving wheel of the vehicle is greater than a preset one, if the result is negative, skipping to S7, if the result is positive, exiting;

S10: judging whether the vehicle is in brake mode, if the result is negative, exiting;

S11: judging whether the speed of the vehicle is more than a second preset value and judging whether the slip ratio of the wheel is greater than a preset slip-ratio value; if either of the two judging results is negative, exiting;

S12: adjusting braking force of the designated driving wheel according to the preset anti-lock strategy;

S13: judging whether the speed of the vehicle is less than the second preset speeding value, if the result is positive, exiting; and S14: judging whether the slip ratio of the wheel is less than a preset minimum slip-ratio value; if the result is negative, returning to S12; if the result is positive, exiting.

Preferably, the preset wheel speed is 2 km/h; the preset slip ratio is 15%; the preset torque partition coefficient is 0.48; the first preset vehicle speed value is 10 km/h; the second preset speed value is 2 km/h; the minimum preset slip ratio is 6%.

Figure 2:
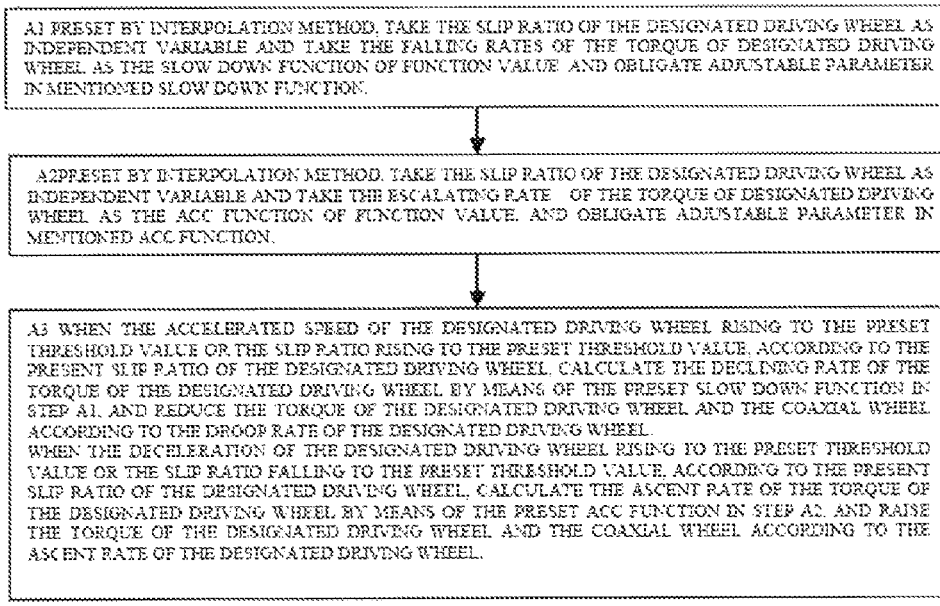
FIG. 2 is a flow chart of the preset high speed anti-slip policy of a road surface self-adapting anti-slip anti-lock control method for an electrically driven mine vehicle
Figure 3:
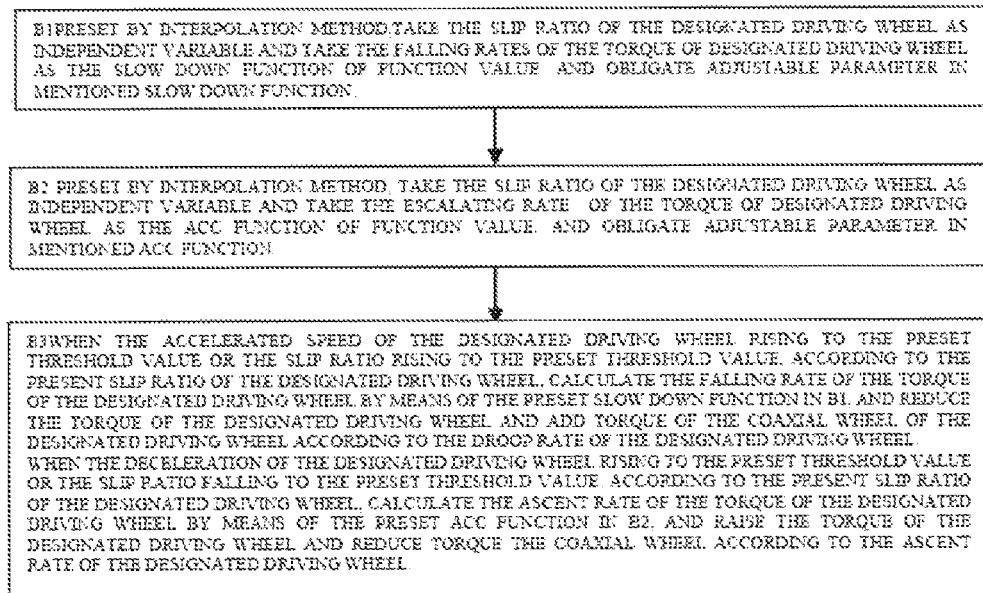
FIG. 3 is a flow chart of the preset low speed anti-slip policy of a road surface self-adapting anti-slip anti-lock control method for an electrically driven mine vehicle
Figure 4:
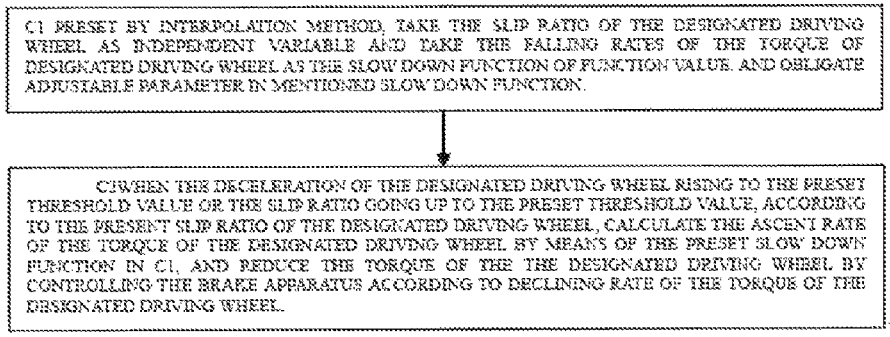
FIG. 4 is a flow chart of the preset anti-lock strategy of a road surface self-adapting anti-slip anti-lock control method for an electrically driven mine vehicle

Based on the above mentioned technical solutions, as shown in FIG. 2, the preset high speed anti-slip strategy comprises the following steps:

Step A1: the speed down function is preset by the interpolation method, which takes the slip ratio of the designated driving wheel as independent variables and takes the declining rate of the designated driving wheel torque as the speed down function of function value, and an adjustable parameter is reversed in the speed down function;

Step A2: the speed up function is preset by the interpolation method, which takes the slip ratio of the designated driving wheel as independent variables and takes the increasing rate of the designated driving wheel torque as the speed up function of function value. And an adjustable parameter is reversed in the speed up function;

Step A3: when the acceleration of the designated driving wheel is increased to its preset threshold value, or the slip ratio is increased to its preset threshold value, the declining rate of the designated driving wheel torque is achieved through the preset speed down function calculation in Step A1 in accordance with the present slip ratio of the designated driving wheel, and the torques of the designated driving wheel and the coaxial wheel are reduced in accordance with the declining rate of the designated driving wheel;

When the deceleration of the designated driving wheel is increased to its preset threshold value, or the slip ratio is reduced to its preset threshold value, the increasing rate of the designated driving wheel torque is achieved through the preset speed up function calculation in Step A2 in accordance with the present slip ratio of the designated driving wheel, and the torques of the designated driving wheel and the coaxial wheel are increased in accordance with the increasing rate of the designated driving wheel. As shown in FIG. 3, the preset low speed anti-slip strategy comprises the following steps:

Step B1: the speed down function is preset by the interpolation method, which takes the slip ratio of the designated driving wheel as independent variables and takes the declining rate of the designated driving wheel torque as the speed down function of function value, and an adjustable parameter is reversed in the speed down function;

Step B2: the speed up function is preset by the interpolation method, which takes the slip ratio of the designated driving wheel as independent variables and takes the increasing rate of the designated driving wheel torque as the speed up function of function value. And an adjustable parameter is reversed in the speed up function;

Step B3: when the acceleration of the designated driving wheel is increased to its preset threshold value, or the slip ratio is increased to its preset threshold value, the declining rate of the designated driving wheel torque is achieved through the preset speed down function calculation in B1 in accordance with the present slip ratio of the designated driving wheel, and the designated driving wheel torque is reduced in accordance with the declining rate of the designated driving wheel, the coaxial wheel torque of the designated driving wheel is increased simultaneously;

When the deceleration of the designated driving wheel is increased to its preset threshold value, or the slip ratio is reduced to its preset threshold value, the increasing rate of the designated driving wheel torque is achieved through the preset speed up function calculation in B2 in accordance with the present slip ratio of the designated driving wheel, and the designated driving wheel torque is increased in accordance with the declining rate of the designated driving wheel, the coaxial wheel torque of the designated driving wheel is reduced simultaneously;

As shown in FIG. 4, the anti-lock strategy comprises the following steps:

Step C1: the speed down function is preset by the interpolation method, which takes the slip ratio of the designated driving wheel as independent variables and takes the declining rate of the designated driving wheel torque as the speed down function of function value, and an adjustable parameter is reversed in the speed down function;

Step C2: when the acceleration of the designated driving wheel is increased to its preset threshold value, or the slip ratio is increased to its preset threshold value, the declining rate of the designated driving wheel torque is achieved through the preset speed down function calculation in C1 in accordance with the present slip ratio of the designated driving wheel, and the designated driving wheel torque is reduced in accordance with the declining rate of the designated driving wheel through the brake control apparatus;

The acceleration threshold, the deceleration threshold, the upper limit threshold of the slip ratio, and the lower limit threshold of the slip ratio should be set according to the specific road condition and vehicle type.

Figure 5:
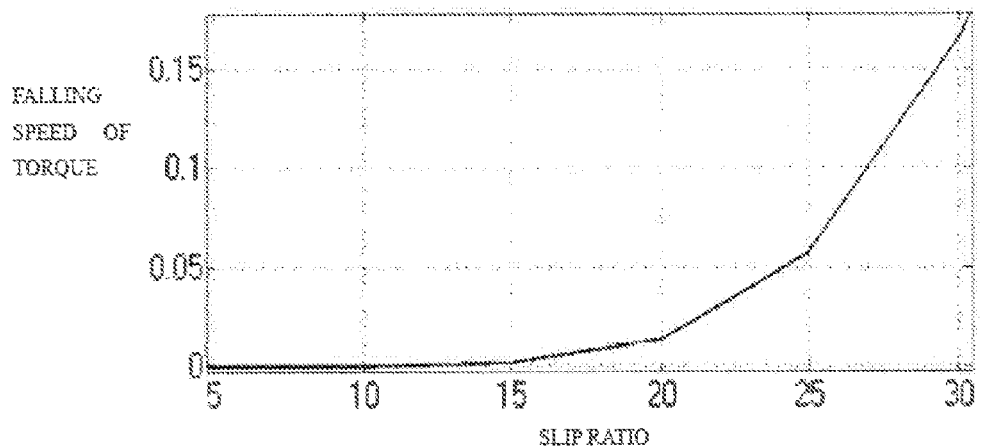
FIG. 5 is a curve chart of the speed down function of a road surface self-adapting anti-slip anti-lock control method for an electrically driven mine vehicle
Figure 6:
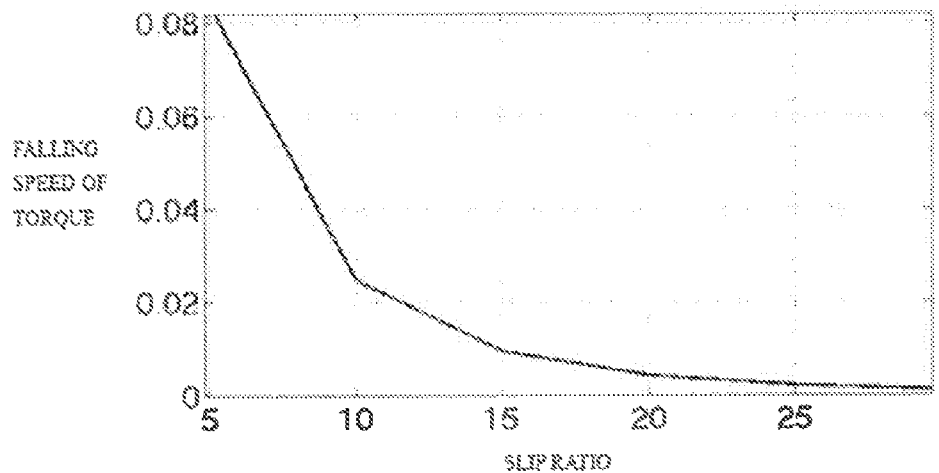
FIG. 6 is a curve chart of the speed up function of a road surface self-adapting anti-slip anti-lock control method for an electrically driven mine vehicle

When the tires are slipping, the designated driving wheel torque should be reduced rapidly. And if the slip ratio is greater, the rate of reducing the torque should be greater. Therefore, the diagram of the speed down function formed by interpolation can employ the curve shown by FIG. 5. When the torque is increased, due to low increased quantity, it should be increased slowly. As a result, the diagram of the acceleration function formed by the interpolation can employ the curve shown by FIG. 6. The examples above are used to explain the differences between the two functions, but it should not be deemed as limitation of the present invention.

The present invention employs the threshold control of the slipping by accelerated speed and slip ratio. When the accelerated speed of the designated driving wheel reaches the threshold value or the slip ratio reach the above threshold value, the control system will judge that the wheels trend to slip. Reduce the torque of the designated driving wheel by reducing driving force to reduce the speed of the wheels. When deceleration of the designated driving wheel reach the threshold value or the slip ratio reach the below threshold value, the control system will increase the torque of the designated driving wheel. As cycle repeats, realize the control of the slipping wheel. If the variation of the accelerated speed is not obvious, only use the slip ratio as threshold value independently.

Figure 7:
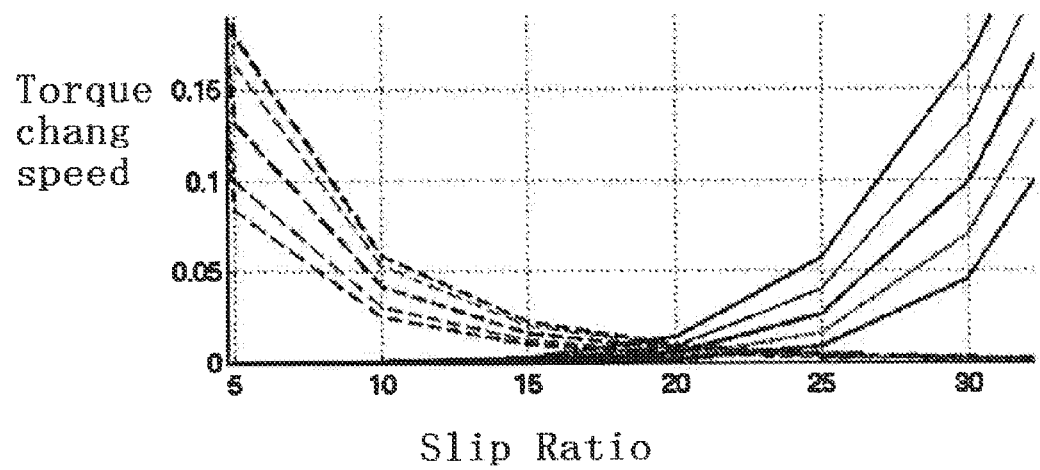
FIG. 7 is a curve chart of the speed down function and speed up function of a road surface self-adapting anti-slip anti-lock control method for an electrically driven mine vehicle adjusted by the adjustable parameter.

For realizing the self-adapt of different roads, the adjustable parameter of the speed down function and ace function is adjusted to form the curves of various velocities as shown in FIG. 7. To dirt roads which have no obvious yielding point, when the designated driving wheel reaches the maximal slip ratio, should reduce torque. To avoid circulation, lessen the velocity of reducing torque by adjusting the controllable parameter of the speed down function, which is equal to keeping the torque stayed in the maximal slip ratio. To the roads with crest value and the slip ratio is different in crest value, the present invention's dealing methods are, adjusting the adjustable parameter of ace function after every circulation to reduce the rate of adding the torque. After several circulations, the speed of adding torque is very slow, which means the torque is constant.

Furthermore, a group of representative slip ratio value of the designated driving wheel is utilized in advance. The rate of descent of the designated driving wheel torque is calculated according to the speed down function. A group of representative slip ratio value of the designated driving wheel is utilized in advance. The increase rate of the torque of the designated driving wheel is calculated according to the speed up function mentioned. The rate of descent of the torque of the designated driving wheel and the increase rate of the torque of the designated driving wheel are filled into the form and acquire the outcome by means of table look-up. The method operating the speed can reduce the cost which controller used to calculate the function. Meanwhile, the method is used to calculate the curve which is difficult to express by equation.

It is obvious for the skilled in the art to make varieties of changes and modifications after reading the above descriptions. Hence, the claims attached should be regarded as all the changes and modifications which cover the real intention and the range of this invention. Any and all equivalent contents and ranges in the range of the claims should be regarded belonging to the intention and the range of this invention.

A road surface self-adapting anti-slip anti-lock control method for an electrically driven mine vehicle that the present invention provided can effectively control vehicles out of slip and lock. The control method is simple, is easy to realize, is strong in self-adaptive capability, has a low requirement on a sensor, is low in cost, and is convenient to debug on the mine vehicle. Therefore, the present invention has industrial applicability.

The invention claimed is:

1. A road surface self-adapting anti-slip anti-lock control method for an electrically driven mine vehicle, wherein, the method is used for an anti-slip, anti-lock system, the method comprising the following steps:

S1: judging whether the vehicle is in drive mode, if a judging result is negative, skipping to step S10; and if the judging result is positive, skipping to S2;

S2: judging whether a speed of a designated driving wheel of the vehicle is greater than a preset wheel-speed value, and judging whether a slip ratio of the wheel is greater than a preset slip-ratio value; exiting, if any of the two judging results is negative; and if the two judging results are positive, skipping to S3;

S3: judging whether the speed of the vehicle is more than a first preset value, and if a judging result is negative, skipping to step S7 and if the judging result is positive, skipping to S4;

S4: adjusting a torque of the designated driving wheel according to a high speed anti-slip policy, then skipping to S5;

S5: judging whether the speed of the designated drive wheel is less than the corresponding preset value, exiting, if a judging result is positive, skipping to S6, if the judging result is negative;

S6: judging whether the torque partition coefficient of the designated driving wheel is greater than the preset one; if a judging result is negative, returning to step S4, if a judging result is positive, exiting;

S7: adjusting the torque of the designated drive wheel according to a low speed anti-slip policy, then skipping to S8;

S8: judging whether the speed of the designated driving wheel of the vehicle is less than a preset wheel-speed value, exiting, if a judging result is positive, and if the judging result is negative, skipping to S9;

S9: judging whether the torque partition coefficient of the designated driving wheel of the vehicle is greater than a preset one, if a judging result is negative, skipping to step S7, if the judging result is positive, exiting;

S10: judging whether the vehicle is in brake mode, if a judging result is negative, exiting, if the judging result is positive, skipping to S11;

S11: judging whether the speed of the vehicle is more than a second preset value and judging whether the slip ratio of the wheel is greater than a preset slip-ratio value; exiting, if any of the two judging results is negative, if the two judging results are positive, skipping to S12;

S12: adjusting the braking force of the designated driving wheel according to the preset anti-lock strategy, then skipping to S13;

S13: judging whether the speed of the vehicle is less than the second preset speeding value, if a judging result is positive, exiting, if the judging result is negative, skipping to S14; and, S14: judging whether the slip ratio of the wheel is less than a preset minimum slip-ratio value; if a judging result is negative, returning to step S12, if the judging result is positive, exiting; wherein the high speed anti-slip policy comprises the following steps:

when the acceleration of the designated driving wheel is increased to a preset threshold value, or the slip ration is increased to a preset upper limit threshold value, the declining rate of the designated driving wheel torque is achieved through the preset speed down function calculation in accordance with the present slip ratio of the designated driving wheel, and the torques of the designated driving wheel and a coaxial wheel are reduced in accordance with the declining rate of the designated driving wheel;

when the deceleration of the designated driving wheel is increased to a preset threshold value, or the slip ratio is reduced to a preset lower limit threshold value, the increasing rate of the designated driving wheel torque is achieved through the preset speed up function calculation in accordance with the present slip ration of the designated driving wheel, and the torques of the designated driving wheel and the coaxial wheel are increased in accordance with the increasing rate of the designated driving wheel;

the speed down function is preset by the interpolation method, which takes the slip ratio of the designated driving wheel as independent variables and takes the declining rate of the designated driving wheel torque as the speed down function of function value, and an adjustable parameter is reversed in the speed down function;

the speed up function is preset by the interpolation method, which takes the slip ratio of the designated driving wheel as independent variables and takes the increasing rate of the designated driving wheel torque as the speed up function of function value, and an adjustable parameter is reversed in the speed up function;

wherein the low speed anti-slip policy comprises the following steps:

when the acceleration of the designated driving wheel is increased to its preset threshold value, or the slip ratio is increased to its preset upper limit threshold value, the declining rate of the designated driving wheel torque is achieved through the preset speed down function calculation in accordance with the present slip ration of the designated driving wheel, and the designated driving wheel torque is reduced in accordance with the declining rate of the designated driving wheel, the coaxial wheel torque of the designated driving wheel is increased simultaneously;

when the deceleration of the designated driving wheel is increased to its preset threshold value, or the slip ratio is reduced to its lower limit preset threshold value, the increasing rate of the designated driving wheel torque is achieved through the preset speed up function calculation in accordance with the present slip ratio of the designated driving wheel, and the designated driving wheel torque is increased in accordance with the declining rate of the designated driving wheel, the coaxial wheel torque of the designated driving wheel is reduced simultaneously;

wherein the speed down function is preset by the interpolation method, which takes the slip ratio of the designated driving wheel as independent variables and takes the declining rate of the designated driving wheel torque as the speed down function of function value, and an adjustable parameter is reversed in the speed down function;

the speed up function is preset by the interpolation method, which takes the slip ratio of the designated driving wheel as independent variables and takes the increasing rate of the designated driving wheel torque as the speed up function of function value, and an adjustable parameter is reversed in the speed up function;

wherein the preset anti-lock strategy comprises: when the acceleration of the designated driving wheel is increased to its preset threshold value, or the slip ratio is increased to its upper limit preset threshold value, the declining rate of the designated driving wheel torque is calculated in accordance with the present slip ration of the designated driving wheel by the preset speed down function, and the declining rate of the designated driving wheel torque is used to reduce the designated driving wheel torque by controlling the brake apparatus; wherein the speed down function is reset by the interpolation method, which takes the slip ratio of the designated driving wheel as independent variables and takes the declining rate of the designated driving wheel torque as the speed down function of the function value, and an adjustable parameter is reversed in the speed down function.

2. The method as disclosed in claim 1, wherein, the preset speed of the wheel is 2 km/h.

3. The method as disclosed in claim 1, wherein, the preset slip ratio is 15%.

4. The method as disclosed in claim 1, wherein, the preset torque partition coefficient is 0.48.

5. The method as disclosed in claim 1, wherein, the second preset speed value is 2 km/h.

6. The method as disclosed in claim 1, wherein, the minimum preset slip ratio is 6%.

7. The method as disclosed in claim 1, wherein, when the designated driving wheel torque is increased continuously, the increased speed of the designated driving wheel torque is reduced by adjusting the adjustable parameter of the speed up function; and/or, when the designated driving wheel torque is reduced continuously, the increased speed of the designated driving wheel torque is reduced by adjusting the adjustable parameter of the speed down function.

\* \* \* \* \*